United States Patent [19]

Okura et al.

[11] Patent Number: 4,930,613

[45] Date of Patent: Jun. 5, 1990

[54] TRANSFERRING APPARATUS

[75] Inventors: Norio Okura; Ryoichi Okura; Tugio Yonetani, all of Hyogo, Japan

[73] Assignee: Okura Tysoki Kabushiki Kaisha, Hyogo, Japan

[21] Appl. No.: 248,638

[22] Filed: Sep. 26, 1988

[30] Foreign Application Priority Data

Mar. 24, 1988 [JP] Japan .................................. 63-70433

[51] Int. Cl.$^5$ ............................................. B65G 37/00
[52] U.S. Cl. ..................................... 198/365; 198/370
[58] Field of Search ............... 198/365, 370, 372, 802, 198/631, 750; 414/278

[56] References Cited

U.S. PATENT DOCUMENTS

| | | | |
|---|---|---|---|
| 3,550,748 | 12/1970 | Hauer | 198/365 |
| 3,912,071 | 10/1975 | Nielsen | 198/365 |
| 4,044,886 | 8/1977 | Sender | 198/750 X |
| 4,096,936 | 6/1978 | Nielsen | 198/365 X |
| 4,763,771 | 8/1988 | Geerts | 198/365 |
| 4,781,281 | 11/1988 | Canziani | 198/365 |

FOREIGN PATENT DOCUMENTS 2111933 7/1983 United Kingdom ................ 198/365
2189451 10/1987 United Kingdom ................ 198/750

Primary Examiner—David A. Bucci
Assistant Examiner—Cheryl L. Gastineau
Attorney, Agent, or Firm—Nilles & Nilles, S.C.

[57] ABSTRACT

A transferring apparatus wherein on a carrier moving along a transferring passage, there is disposed a moving frame which is movable in both directions across the moving direction of the carrier, at each of the two sides of the carrier, there is arranged at least one (n=1, 2, 3, - - -, and so on) belt supporting member, and on the moving frame, there are borned as many (=2n) rollers as the total number of the belt supporting members in a manner to correspond to the members. In the upper portion of the carrier, there is arranged the intermediate portion of a conveyor belt which has a driving direction across the moving direction of the conveyor belt and has its two end portion each made to run alternately in a folded back manner on the belt supporting members at the two sides and then on the rollers corresponding to the belt supporting members until they are fixed at the two sides of the carrier, so that the conveyor belt is driven by moving the aforementioned moving frame sideway.

3 Claims, 11 Drawing Sheets

F I G. 1 A
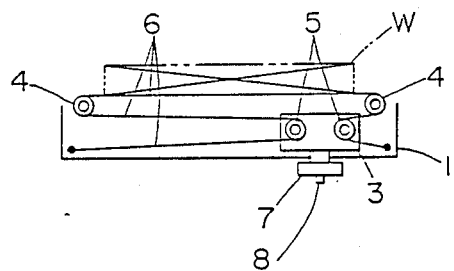
F I G. 1 B
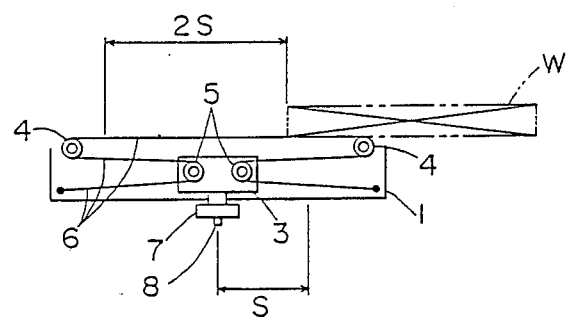
F I G. 1 C
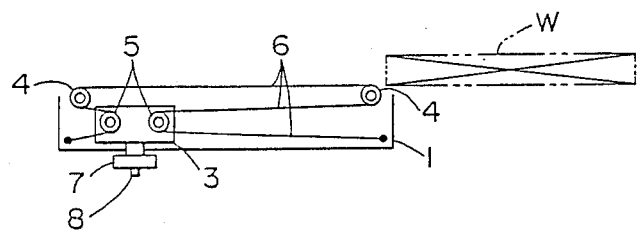

F I G. 3
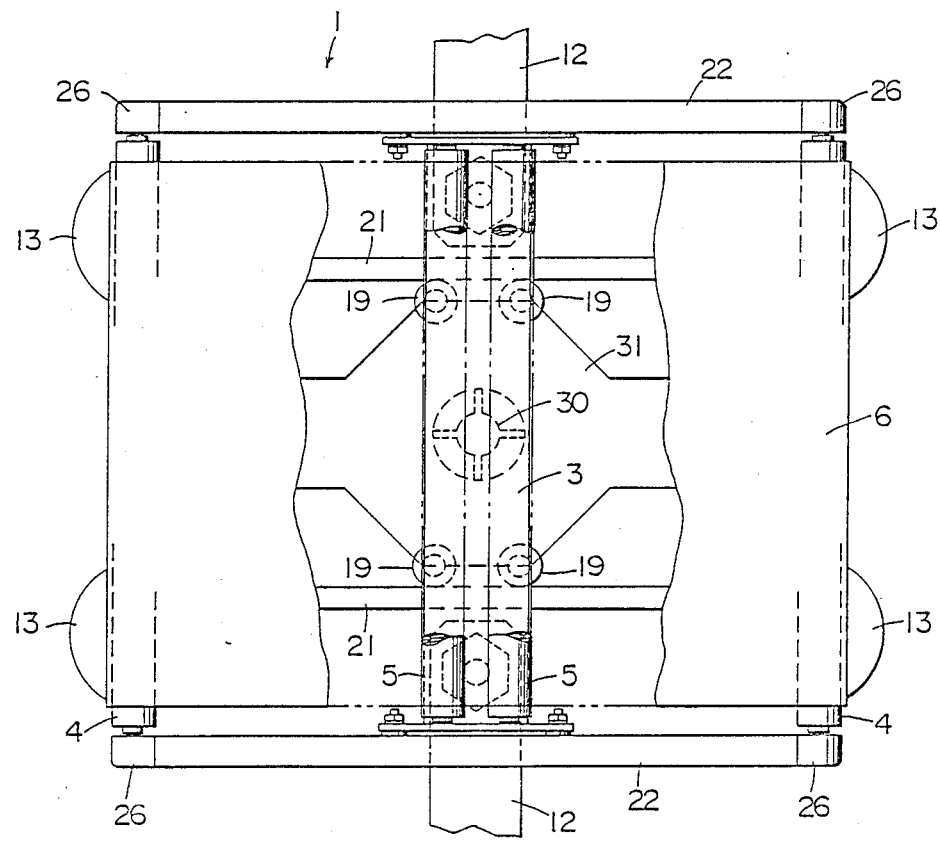

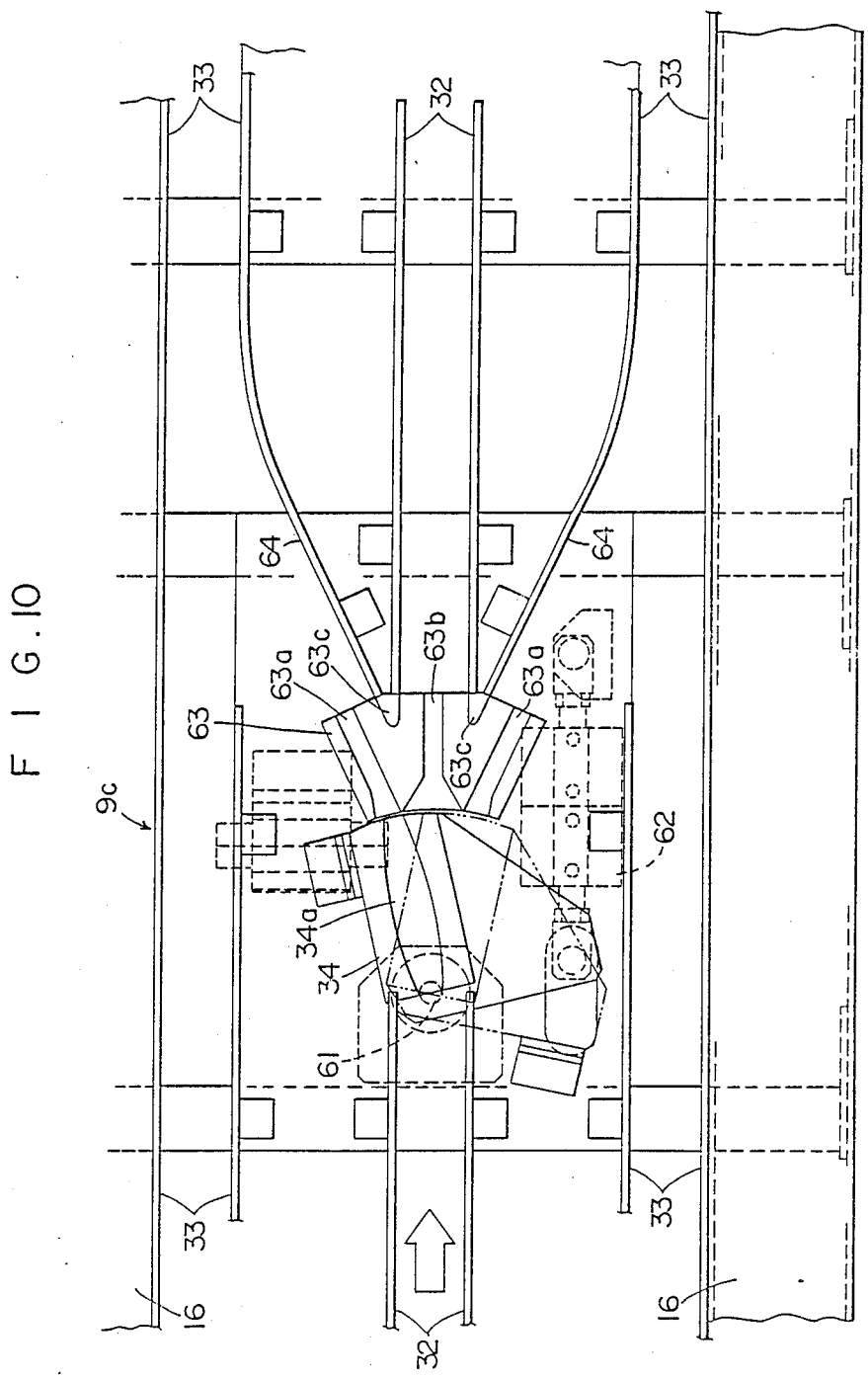

TRANSFERRING APPARATUS

BACKGROUND OF THE INVENTION

1. Field of the Invention

The present invention relates to a transferring apparatus capable of transferring articles along a transferring passage and carrying out the same to the side of the transferring passage.

2. Description of the Prior Art

There is a transferring apparatus called the "transferring and sorting apparatus", in which articles are transferred along a transferring passage and are carried out to the side of the transferring passage selectively in accordance with their kinds or their places of shipment at several positions of the transferring passage. The transferring apparatus is available in types, in which the articles on a conveyor constituting the transferring passage are pushed out sideway by a scraper or pusher and in which trucks or slats running along the transferring passage are inclined sideway to drop their articles sideway by the force of gravity. However, the articles to be sorted are limited because it is difficult to sort articles, which cannot be transferred by means other than a belt conveyor, such as small, bulk, light, thin or rough bottomed articles.

A transferring apparatus to be applied to the transferring and sorting of such articles is disclosed in Japanese Patent Laid-Open No. 62-74823, for example.

This transferring apparatus is basically constructed such that a transferring member (or tray unit) moving along a transferring passage (or guide rail) is equipped with an article conveying belt having a transferring direction across the moving direction of the transferring member and such that an actuating mechanism (or a tray unit sorting actuating means) for driving the belt on the transferring member is disposed at the side of the transferring passage. Specifically, there is mounted on the transferring member through a pair of pulleys an endless belt which has a transferring direction across the moving direction of the transferring member. This belt is equipped with a plurality of guide wheels. Along the transferring passage, there are disposed a pair of straight tracks which engage with those guide wheels at the side of the transferring member. These straight tracks at the two sides are connected by inclined tracks which are disposed in the transferring passage in the form of a letter X. A vertically movable gate is disposed at each intersection between the straight tracks and the inclined tracks. By switching the gate at the side of the transferring passage, the guide wheels at the side of the transferring member being moved are sequentially guided from one of the straight tracks through the inclined track to the other straight track. As a result, the endless belt of the transferring member being moved is driven to the side of the transferring passage to carry out the articles from the belt to the side of the transferring passage.

In the transferring apparatus disclosed in the above-identified Laid-Open, the members to be driven (or the guide wheels) at the side of the transferring member are moved together with the belt across the transferring passage by the actuating mechanism (such as the tray unit sorting actuating means composed of the straight tracks, the inclined tracks and the gates) disposed at the side of the transferring passage. At the side of the transferring member, however, the moving distance of the belt and the moving distance of the members to be actuated (or the guide wheels) are equal to raise a problem that the actuation stroke of the moved members (or the guide wheels) at the side of the transferring member has to be made larger than the width of the transferring member so as to completely carry out the articles on the belt. In order to solve this problem, the belt at the side of the transferring member has to be equipped at a predetermined spacing with a plurality of actuated members (or guide wheels), which must be sequentially actuated twice or more by the actuating mechanism (or the tray unit sorting actuation means) at the side of the transferring passage.

SUMMARY OF THE INVENTION

An object of the present invention is to provide a transferring apparatus, in which a transferring member moving on a transferring passage is equipped with a conveyor belt having a transferring direction across the moving direction of the transferring member and in which the conveyor belt is driven by an actuating mechanism disposed at the side of the transferring passage, for providing a long stroke driving of the conveyor belt at the transferring passage with a short actuation stroke.

In the transferring apparatus of the present invention, on a carrier 1 moving along a transferring passage 2, there is disposed a moving frame 3 which is movable in both directions across the moving direction of the carrier 1. At each of the two sides of the carrier 1, there is arranged at least one (n=1, 2, 3, - - -, and so on) belt supporting member 4, 75. On the moving frame 3, there are borne as many (=2n) rollers 5 as the total member of the belt supporting members 4 or in a manner to correspond to the members 4, 75. On the upper portion of the carrier 1, there is arranged the intermediate portion of a conveyor belt 6 which has a driving direction across the moving direction of the carrier 1. This conveyor belt 6 has its two end portions each made to run alternately in a folded back manner on the belt supporting members 4, 75 at the two sides and then on the rollers 5 corresponding to the belt supporting members 4, 75 until they are fixed at the two sides of the carrier 1. The conveyor belt 6 is driven by moving the aforementioned moving frame 3 sideway.

In a transferring apparatus according to another embodiment of the present invention, on a carrier 1 moving along a transferring passage 2, there is disposed a moving frame 3 which is movable in both directions across the moving direction of that carrier 1. At each of the two sides of the carrier 1, there are arranged at least two or more (i.e., 1+n,n=1,2,3 ---, and so on) belt supporting members 4, 75. On the moving frame 3, there are borne as many (=2n) rollers 5 as the total number of the belt supporting members 4, 75 minus 2 in a manner to correspond to the belt supporting members 4, 75. Above the carrier 1, there is arranged the intermediate portion of a conveyor belt 6 which has its transferred direction across the moving direction of the carrier 1. This conveyor belt 6 has its two end portions each made to run alternately in a folded back manner on the belt supporting members 4, 75 at the two sides and the rollers corresponding to the belt supporting members 4, 75 until they are fixed on the moving frame 3. Thus, the conveyor belt 6 is driven by moving that moving frame 3 sideway.

In the transferring apparatus of the present invention, the conveyor belt 6 is driven by moving the moving frame 3. At this time, the intermediate portion of the conveyor belt 6, i.e., the portion for conveying an article W can be moved integral multiples of the moving stroke of the moving frame 3. When the setting of the conveyor belt 6 and a fixing position thereof are secured appropriately. Specifically, the intermediate portion of the conveyor belt 6 can be moved even multiples (2n, e.g., 2, 4, 6, - - -, and so on) of the stroke according to the first invention and odd multiples (2n+1, e.g., 3, 5, 7, - - -, and so on) of the stroke according to the second invention. Other objects and features of the present invention will become apparent from the following description taken with reference to the accompanying drawings.

BRIEF DESCRIPTION OF THE DRAWINGS

In the accompanying drawings showing the embodiments of the transferring apparatus of the present invention:

FIGS. 1A to 1C and FIGS. 2A to 2C are diagrams for explaining the principles of transferring apparatus according to the first and second embodiments, respectivly;

FIGS. 3 to 6 are partially cut-away top plan, front elevation, top plan and side elevation showing a carrier of FIG. 2 corresponding to the second embodiment;

FIG. 10 is a top plan view showing another actuating means disposed in the transferring passage;

DESCRIPTION OF THE PREFERRED EMBODIMENTS

Figure 2A:
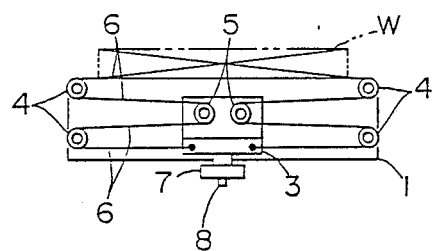

The transferring apparatus according to the present invention will be described at first in respect of its principle and then in detail with reference to FIGS. 1A to 1C and FIGS. 2A to 2C.

Designated by reference numeral 1 is a carrier which is made movable back and forth, as shown, along a transferring passage 2 which will be described later. On the carrier 1, there is disposed a moving frame 3 which is movable to the right and left, as shown, across the moving directions of the carrier 1.

Figure 2B:
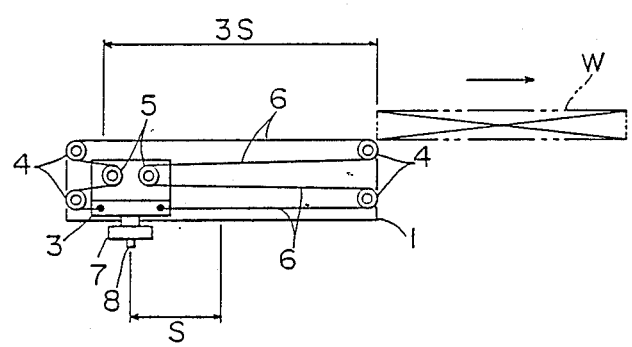
Figure 2C:
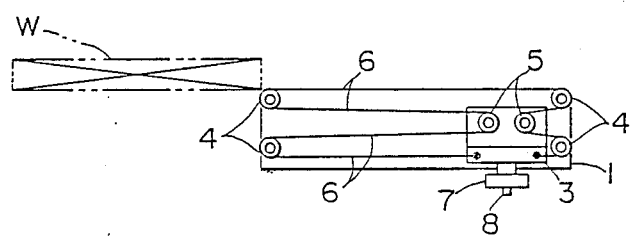
Figure 4:
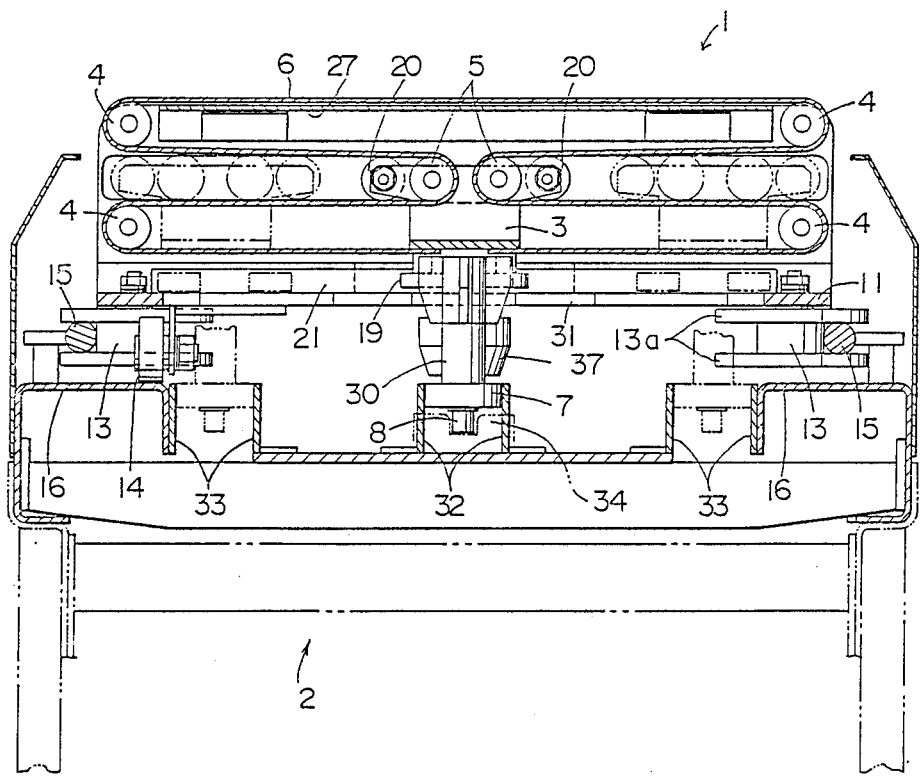
Figure 5:
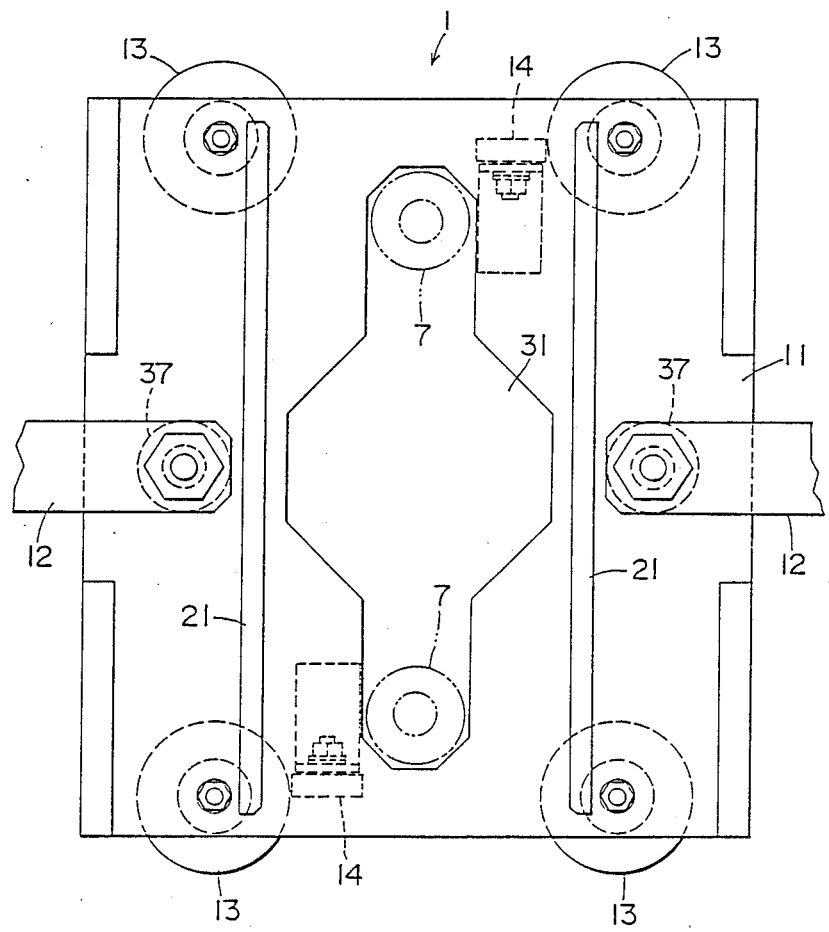
Figure 6:
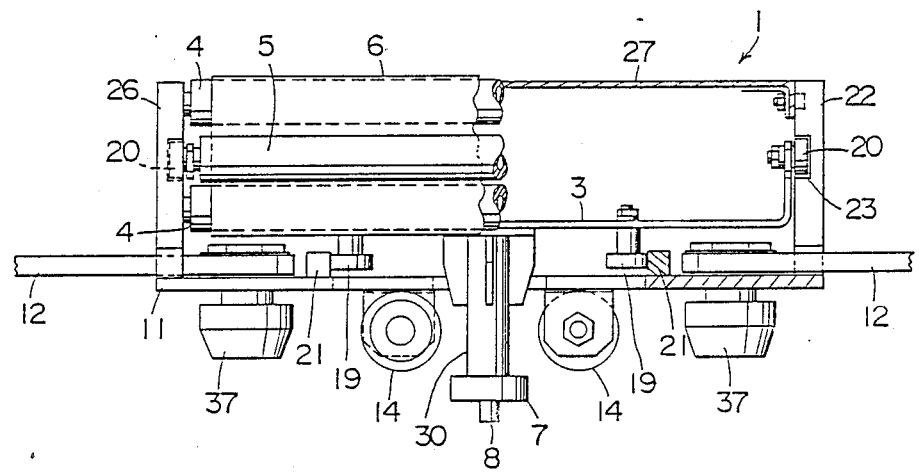

At the two sides of the carrier 1, moreover, there are arranged and borne in parallel a pair of members or outer rollers 4, in one example of the present invention shown in FIGS. 1A to 1C, and two pair of members in the other example of the present invention shown in FIGS. 2A to 2C. On the other hand, two inner rollers 5 are borne on the moving frame 3 in both the examples of FIGS. 1A to 1C and 2A to 2C.

Above the carrier 1, moreover, there is arranged the central portion of a conveyor belt 6 which is made of a flat belt along both transferring directions across the moving directions of the carrier 1. The two end portions of the conveyor belt 6 are fitted alternately in a folded back manner on the two side rollers 4 and intermediate or inner rollers 5 and are then fixed on the two sides of the carrier 1, in the example of the present invention shown in FIGS. 1A to 1C, and on the moving frame 3 in the example of the present invention shown in FIGS. 2A to 2C.

With the construction described above, the moving frame 3 is moved to the two sides by pushing an engagement member such as a roller 7, which is borne in the lower portion of the moving frame 3, or a pin 8, which bears the roller 7 and projects downward therefrom, with the use of later-described actuating means 9a, 9b, 9c and 9d disposed in the transferring passage 2. Then, the rollers 4 act as fixed pulleys whereas the rollers 5 act as running rollers so that they carry the intermediate portion of the conveyor belt 6 in the direction opposite to the moving direction of the moving frame 3 a distance of integral multiples of the moving stroke S of the moving frame 3, i.e., 2S in the example of FIGS. 1A to 1C and 3S in the example of FIGS. 2A to 2C.

As a result, the intermediate portion of the conveyor belt 6 above the carrier 1 can carry an article W along the transferring passage 2 as the carrier 1 moves. This article W can be carried out to the sides of the transferring passage 2, along which the carrier 1 moves, by the movement of the moving frame 3.

In the example of FIGS. 1A to 1C, moreover, the article W is supported on the intermediate portion of the conveyor belt 6 above the carrier 1 with the moving frame 3 being positioned at one side of the carrier 1. If the moving frame 3 is moved within the carrier 1 from the position of FIG. 1A through the position of FIG. 1B to the position of FIG. 1C, the article W can be completely carried out to one side.

Incidentally in the foregoing example, two at one side and a total of four rollers 4 are arranged at the two sides of the carrier 1, and equally four rollers 5 are arranged in the moving frame 3. With these rollers 4 and 5 being vertically arranged, the conveyor belt 6 is made to run. Then, the intermediate portion of the belt 6 in the upper portion of the carrier 1 moves four times the stroke of the moving frame 3. If the rollers 4 and 5 are likewise increased, the intermediate portion of the conveyor belt 6 makes an even multiples of stroke movement, namely six, eight or so on times that of the moving frame.

In the example of FIGS. 2A to 2C, moreover, when the moving frame 3 is positioned at the center of the carrier 1, as shown in FIG. 2A, the article W is placed on the intermediate portion of the conveyor belt 6 in the upper portion of the carrier 1. If the moving frame 3 is moved from the position of FIG. 2A to the left within the carrier 1, as shown in FIG. 2B, the article W can be completely carried out to the righthand side. Inversely, if the moving frame 3 is moved from the position of FIG. 2A to the right, as shown in FIG. 2C, the article W can be completely carried out to the lefthand side.

If, in the foregoing example, three at one side and a total of six rollers 4 are disposed vertically at two sides of the carrier 1 whereas four rollers 5 are arranged vertically at two sides of the moving frame 3 and if the conveyor belt 6 is made to run on the rollers 4 and 5, the intermediate portion of the conveyor belt 6 in the upper portion of the carrier 1 makes a five-times stroke movement. If the rollers 4 and 5 are likewise increased, the intermediate portion of the conveyor belt 6 will make an odd multiple of stroke movement, namely, nine and so on times that of the moving frame 3.

FIGS. 3 to 6 show another embodiment of the present invention and the detail of the carrier 1 of three-times stroke type shown in FIGS. 2A to 2C.

The carrier 1 has a plate base 11 which is connected through a link 12 to the base 11 of another carrier 1. The base 11 has its bottom equipped at its two sides with a plurality of horizontal and vertical wheels 13 and 14. These wheels 13 and 14 engage with rod and plate rails 15 and 16, respectively, which constitute the aforementioned transferring passage 2. The carrier 1 is positioned in the transverse and vertical directions by the engagements between the horizontal wheels 13 with flanges 13a at both ends thereof and the rod rail 15. The load of the carrier 1 is supported by the engagements between the vertical wheels 14 and the plate rail 16.

The moving frame 3 is formed by folding the two ends of a narrow plate upward and is equipped with a plurality of horizontal and vertical wheels 19 and 20. Of these, the horizontal wheels 19 engage with a pair of guide rails 21 laid on the base 11, and the vertical wheels 20 engage with the guide grooves 23 of a pair of side frames 22 mounted on the base 11. Thus, the moving frame 3 is so supported as to move at a right angle with respect to the moving directions of the carrier 1.

The aforementioned rollers 4 are borne in brackets 26 which are attached to the two ends of the side frame 22, and the intermediate portion of the conveyor belt 6, i.e., the portion for supporting the article W is supported on a support plate 27 which is interposed between the side frames 22.

On the other hand, the roller 7 acting as the engagement member is borne at the lower end of a support lever 30, which is attached to the lower portion of the moving frame 3, on the pin 8 acting as the engagement member. These roller 7 and pin 8 project downward from an opening 31 of the base 11 such that the roller 7 engages between a pair of guide rails 32 located at the central portion of the transferring passage 2 or a pair of guide rails 33 located at each side of the fransferring passage 2, whereas the pin 8 engages with a changeover guide 34 or the like of the transferring passage 2.

Incidentally, in the lower portion of the base 11, a roller 37 is provided on each end of the aforementioned link 12 for running drive. This roller 37 engages with the spiral groove of a later-described drive screw 38.

Figure 7:
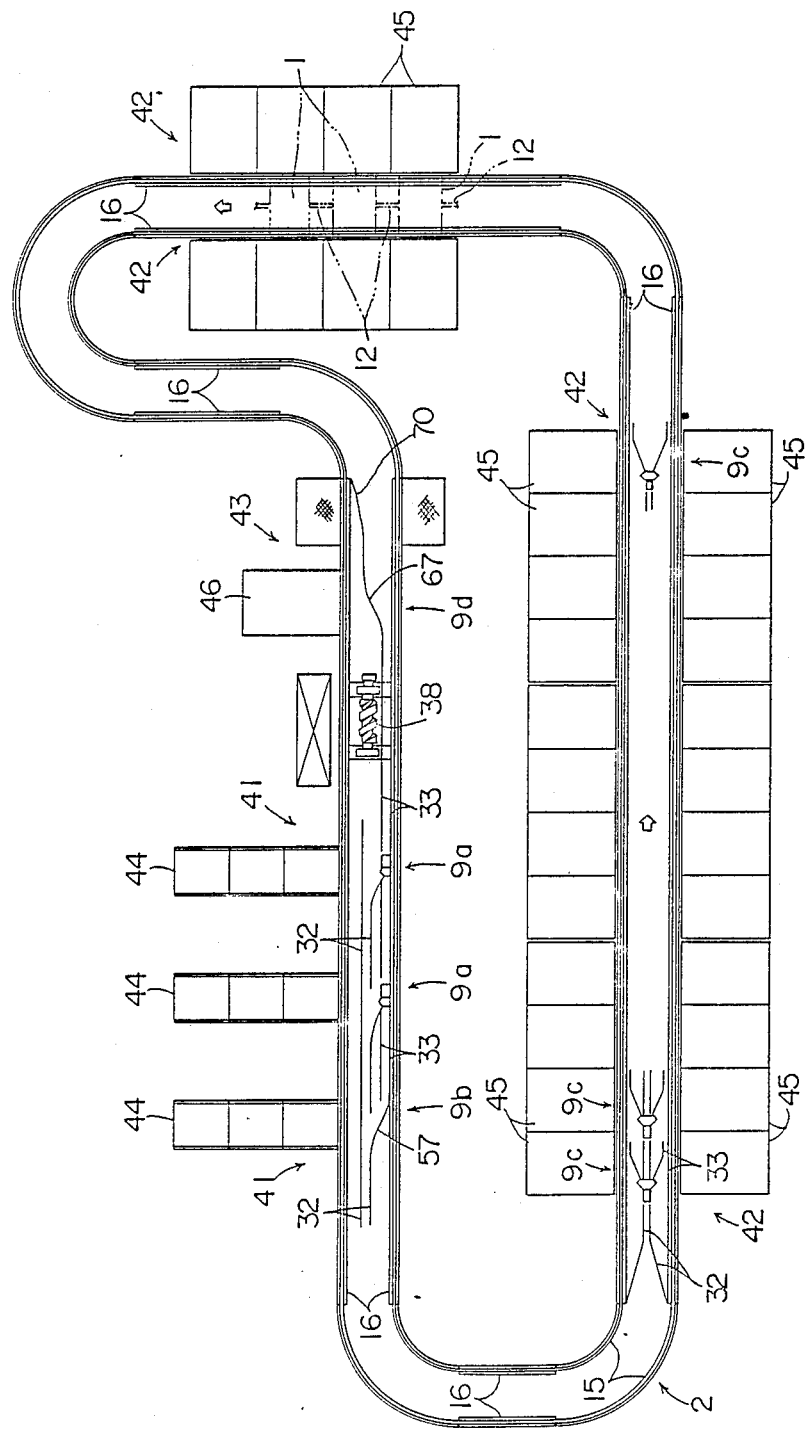
FIG. 7 is a top plan view showing a transferring and sorting apparatus to which the transferring apparatus of the present invention is applied.

FIG. 7 shows one example of the layout where the carrier 1 is used as a transferring and sorting apparatus.

The transferring passage 2 is formed endless, and a number of carriers 1 are supported through their wheels 13 and 14 on the running rails 15 and 16 constituting that transferring passage 2. The numerous carriers 1 are supported movably through their respective wheels 13 and 14 and are hinged and connected to each other over the transferring passage 2 through the links 12. If the drive screw 38 of the drive mechanism disposed in a suitable portion of the transferring passage 1 is rotated, one or several carriers 1 are driven by the engagements between that drive screw 38 and the running drive rollers 37 of the carriers 1 so that the numerous carriers over the transferring passage 2 are circulated as a whole counter-clockwise, as seen in the drawings.

Of the running rails 15 and 16 constituting the transferring passage 2, the plate rails 16 for the vertical wheels 14 are disposed only at the straight portions of the transferring passage 2 to eliminate the squeaking noises of the vertical wheels 14 at the curved portions.

The transferring passage 2 is provided, in the recited order in the moving direction of the carriers 1, with three carry-in stations 41, a number of carry-out sorting stations 42 and one carry-out cancelling station 43. Each of the carry-in stations 41 is connected at its one side to a carry-in conveyor 44 for carrying the article W onto the conveyor belt 6 of the carrier 1. Each of the carry out sorting stations 42 is provided at its two sides with receiving means 45 for receiving the article W carried out from the conveyor belt 6 of the carrier 1. The carry-out cancelling station 43 is also provided at its one side with receiving means 46 for receiving the article W carried out from the conveyor belt 6 of the carrier 1.

Moreover, the aforementioned carry-in stations 41, carry-out sorting stations 42 and carry-out cancelling station 43 are equipped with the actuating means 9a, 9b, 9c and 9d for moving the rollers 7 and the pins 8 of the lower portions of the moving frames 3 of the carriers 1 sideways to drive the conveyor belt 6.

Figure 9:
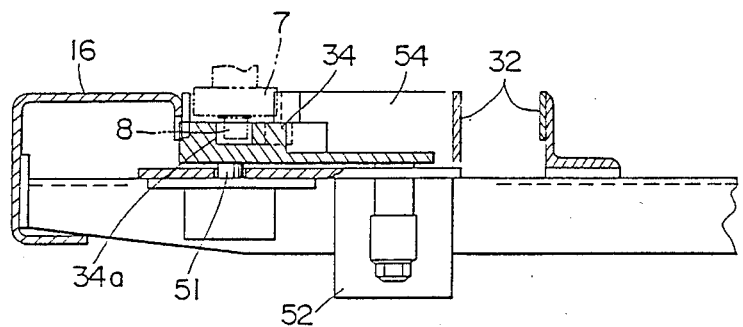
FIG. 9 is a section showing a portion of the same.
Figure 8:
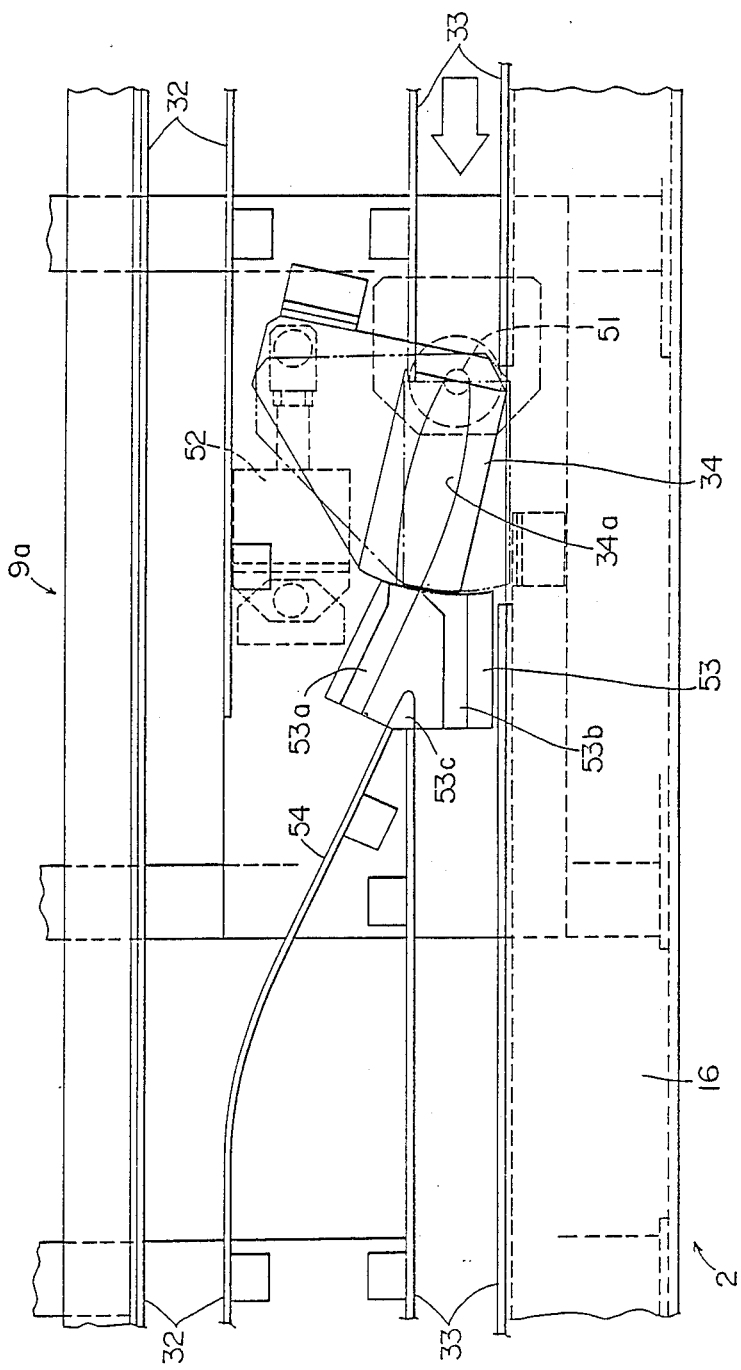
FIG. 8 is a top plan view showing actuating means which is disposed in a transferring passage of the transferring and sorting apparatus.

Each of the actuating means 9a disposed at the upstream two stations 41 of the three carry-in stations 41 is composed, as shown in FIGS. 8 and 9, of a movable change-over guide 34 which can be rotated on a shaft 51 by an air cylinder 52, a fixed change-over guide 53 and a fixed change-over rail 54. The actuating means 9a actuates the individual carriers 1 selectively. For this actuation, the movable change-over guide 34 is turned clockwise into the position of FIG. 8 by the actions of the air cylinder 52. In accordance with the movement of the carrier 1, the rollers 7 and the pins 8 in the lower portion of the moving frame 3, which are moving between the guide rails 33 at the side of the transferring passage 2 opposite to the carry-in conveyor 44, are further moved to between the guide rails 32 at the central portion of the transferring passage 2 by the engagement between a groove 34a of the movable change-over guide 34 and the pin 8, by the subsequent engagement between a groove 53a of the fixed change-over guide 53 and the pin 8, and further by the engagement between the fixed change-over rail 54 and the roller 7. Thus, the conveyor belt 6 can be driven in a direction to carry in the article W from the carry-in conveyors 44 by the movements of the roller 7 and the pin 8 from between the guide rails 33 to between the guide rails 32, i.e., the sideway movements of the moving frame 3. When out of actuations, on the other hand, the groove 34a of the movable change-over guide 34 merges into a groove 53b of the fixed change-over guide 53 so that the roller 7 and the pin 8 moving between the guide rails 33 are continuously moved between the guide rails 33 without driving the conveyor belt 6.

Incidentally, the fixed change-over guide 53 is equipped with a projection 53c which constitutes an intersection between the guide rail 33 and the change-over rail 54.

Moreover, the actuating means 9b disposed at the most downstream one 41 of the three carry-in stations 41 is constructed of a fixed change-over rail 57 so that it can engage with the roller 7 to move the roller 7 and the pin 8, which are moving between the guide rails 33 at the side of the transferring passage 2 opposite to the carry-in conveyor 44, to between the guide rails 32 at the central portion of the transferring passage 2. This movement can drive the conveyor belt 6 in a direction to pull in the article W from the carry-in conveyor 44.

Furthermore, each of the actuating means 9c disposed at the numerous carry-out sorting stations 42 is constructed, like the actuating means 9a shown in FIGS. 8 and 9, of the movable change-over guide 34 to be turned on a shaft 61 by an air cylinder 62, a fixed change-over guide 63 and fixed change-over rails 64, as shown in FIG. 10. The actuating means 9c thus constructed actuates the individual carriers 1 selectively. For this actuation, the movable change-over guide 34 is turned to the position shown in the figure or turned clockwise by the actions of the air cylinder 62. In accordance with the movement of the carrier 1, the rollers 7 and the pins 8 which are moving between the guide rails 32 at the center of the transferring passage 2 opposite to the carry-in conveyor 44, are further moved to between the guide rails 33 at the one or the other side portion of the transferring passage 2 by the engagement between the groove 34a of the movable change-over guide 34 and the pin 8, by the subsequent engagement between either of a pair of side grooves 63a of the fixed change-over guide 63 and the pin 8, and further by the engagement between the fixed change-over rail 64 and the roller 7. By these movements, the conveyor belt 6 can be driven in a direction of carrying out the article W to the corresponding receiving means 45. When not in actuations, on the other hand, the groove 34a of the movable change-over guide 34 merges into a groove 63b of the fixed change-over guide 63 so that the roller 7 and the pin 8 moving between the guide rails 32 are moved to between the guide rails 32 without driving the conveyor belt 6.

Incidentally, the fixed change-over guide 63 is equipped with a projection 63c which constitutes an intersection between the guide rail 32 and the change-over rail 64.

On the other hand, the actuating means 9d disposed at the carry-out cancelling station 43 is constructed of a fixed change-over rail 67 and can move the rollers 7 and the pins 8, which are moving at the central portion of the transferring passage 2, to between the guide rails 33 at the side of the transferring passage 2 opposite to the receiving means 46 by the engagement with the rollers 7. By these movements, the conveyor belt 6 can be driven in a direction of carrying out the articles W to the receiving means 46.

Incidentally at the upstream of the carry-out cancelling station 43, there is disposed a fixed change-over rail 70 for moving the rollers 7 and the pins 8 of the carrier 1, which are moving to the carry-out cancelling station 43, from the side portion to the central portion of the transferring passage 2 by the engagement with the rollers 7.

Thus, in the transferring and sorting apparatus, the numerous carriers 1 are circulated counterclockwise along the transferring passage 2. At any of the carry-in stations 41 during the circulations, the articles W are carried in to the intermediate portion of the conveyor belt 6 over the moving carrier 1 by the carry-in conveyor 44. In synchronism with this, the conveyor belt 6 of the carrier 1 is driven by the actuating means 9a and 9b to pull in the articles W onto the carrier 1 so that the articles W may be transferred to the carry-out sorting stations 42 by the movements of the carrier 1.

If each of the carry-out sorting stations 42 is reached by the carrier 1 carrying the articles W to be carried out and sorted, the actuating means 9c drives the conveyor belt 6 of the carrier 1 toward a predetermined receiving means 45 to carry out the articles W from the conveyor belt 6 to that receiving means 45.

If, on the other hand, each of the carry-out sorting stations 42 is reached by the carrier 1 carrying the articles W to be neither carried out nor sorted, the actuating means 9c is not actuated, but the carrier 1 carrying those articles W is moved to next carry-out sorting station 42.

By accomplishing these operations at each carry-out sorting station 42, the articles W, which have been carried in onto the conveyor belt 6 of the carriers 1, are sorted to be delivered to the receiving means 45 in accordance with their kinds or their places of shipment.

On the other hand, there may be articles W which have failed to be sorted or carried out to any of the receiving means due to such reasons as the target receiving means 45 is occupied by the articles W having been previously carried out. In this circumstance, those articles W may be moved and circulated as they are together with the carriers 1 along the transferring passage 2 until the next chance of carry-out and sorting. In this embodiment, the conveyor belt 6 of the carrier 1 can be driven at the carry-out cancelling station 43 by the actuating means 9d to carry out the articles W to the receiving means 46.

Incidentally, the rollers 7 and the pins 8 below the moving frames 3 of the carriers 1 have moved to the side of the transferring passage 2, after they passed the carry-out cancelling station 43, and pass the side of the drive screw 38. As a result, the rollers 7 and pins 8 are not likely to be broken by the drive screw 38 and are prepared for being carried in at the subsequent carry-in station 41.

In this embodiment, the rollers 7 and the pins 8 are used as the engagement members. Of the actuating means 9a, 9b, 9c and 9d, accordingly, the change-over guides 34, 53 and 63 and the smaller-diameter pins 8 are in engagement at first in both the actuating means 9a and 9c to be selectively actuated or not actuated, as shown in FIGS. 8 and 9, and shown in FIG. 10. This is because more prompt movements can be achieved with less starting shocks by actuating the smaller-diameter pins 8 than by actuating the larger-diameter rollers 7. After the start of actuations by the smaller pins 8 and at other stations, noise are prevented by the engagements of the rotatable rollers 7 with the change-over rails 54, 57, 64, 67 and 70 and the guide rails 32 and 33.

In the actuating means 9a and 9c capable of selecting the aforementioned actuations and non-actuations, moreover, the inner sides of the grooves 34a of the change-over guides 34 to be brought at first into engagement with the pins 8 are recessed to cause the movements of the pins 8 slowly at first and then gradually faster to reduce the shocks cf the pins 8 being guided at the start of the movements. As a result, the movements of the pins 8 are smoothly effected in synchronism with the conveyor belt 6 so that the articles W can be carried in and out smoothly and reliably while reducing the load upon the change-over guide 34.

In the aforementioned actuating means 9a and 9c, furthermore, the fixed change-over guides 53 and 63 and the change-over rails 54 and 64 are used in addition to the movable change-over guide 34, and this movable change-over guide 34 is cut short to shorten the time period during which the pin 8 moves the movable change-over guide 34. This allows the movable change-over guide 34 to return quickly for the subsequent operations.

Figure 11:
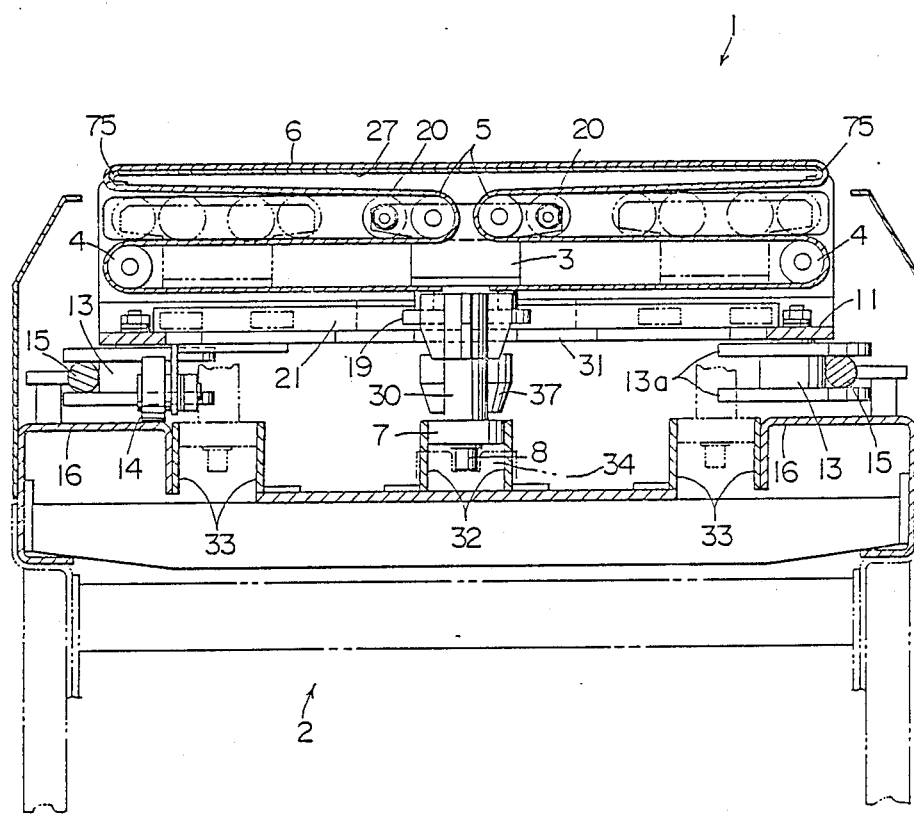
FIG. 11 is a partially cut-away front elevation showing a modification of the carrier.

Incidentally in this embodiment, the rollers 4 are used as the members which are disposed at the two sides of the carrier 1 to drive the conveyor belt 6. The rollers 4 may be replaced by rods of small diameter. Alternatively, as shown in FIG. 11, the support plate 27 supporting the conveyor belt 6 is provided at its two end portions with curved portions 75 with such a small curvature as allows the conveyor belt 6 to slide on them. These curved portions 75 may be used as the members for driving the conveyor belt 6. According to this modification, it is possible to reduce the height of the two ends of the conveyor belt 6 from the transferring surface and to reduce the height of the carrier 1, accordingly.

Figure 12:
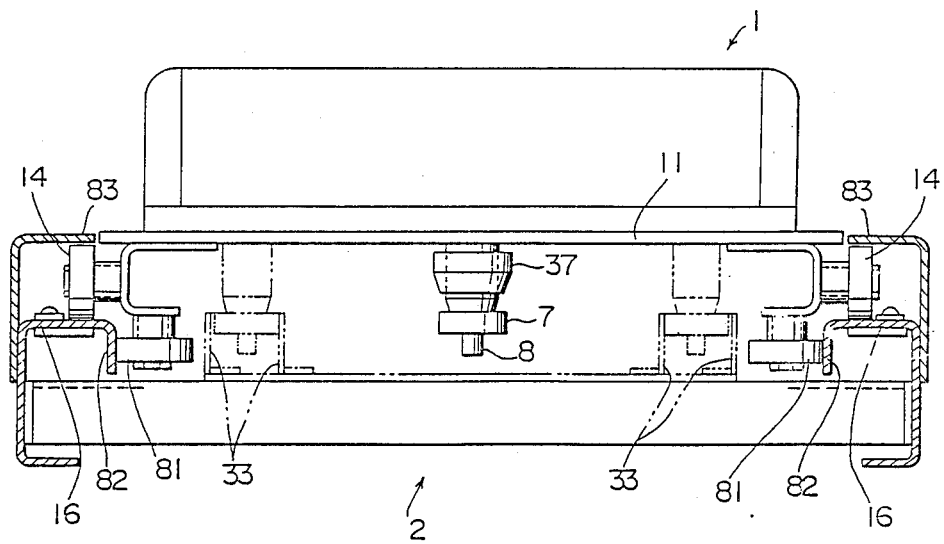
FIG. 12 is a front view of a modification of the transferring apparatus.

In the other embodiment of the present invention, as shown in FIG. 12, the wheel 13 having the flanges 13a in the above embodiment is replaced by a normal horizontal wheel 81 having no flanges, so that the wheel 81 is brought into engagement with an inner surface of a planar running rail 82 provided at the transferring passage 2. Further, the rod rail 15 in the above embodiment is eliminated and substituted therefor by the plate rail 16 being extended along the full length of the transferring passage 2. In order to prevent the carrier 1 from floating, a plate rail 83 is disposed above the vertical wheel 14 at the transferring passage 2.

As has been described hereinbefore, according to the present invention, there is provided a transferring apparatus in which the carrier to be moved along the transferring passage is equipped with the conveyor belt having a transferring direction across the moving direction of the carrier and in which the conveyor belt is driven by the actuating means disposed at the side of the transferring passage. The conveyor belt at the side of the carrier can be driven, with a short actuation stroke, a long stroke, e.g., an even multiples of stroke such as two, four, six and so on times in the first embodiment of the present invention or an odd multiples of stroke such as three, five, seven and so on times in another embodiment of the present invention.

What is claimed is:

1. A transferring apparatus comprising: a carrier (1) movable in a direction along a transferring passage (2) that has an actuating means (9) disposed therein, said carrier having an upper portion and spaced apart sides; a moving frame (3) disposed on said carrier for movement in both directions across the moving direction of said carrier; said frame having a lower portion and an engagement member (7, 8), at least two or more belt supporting members (4, 75) arranged at each of said sides of said carrier; as many inner rollers (5) as the total number of the belt supporting members minus two mounted on said moving frame in spaced corresponding relation to said belt supporting members, a conveyor belt (6) having two end portions, an intermediate portion, and driving directions which are across said moving direction of the carrier with said intermediate portion being arranged on said upper portion of said carrier, said two end portions being trained around respective ones of said belt supporting members at said carrier sides, to run alternately in a folded-back manner between said belt supporting members and to said corresponding inner rollers spaced from said belt supporting members and then secured on said moving frame, so that said conveyor belt is driven by moving said moving frame sideways by the engagement of said engagement member on said lower portion of the moving frame with said actuating means disposed in transferring passage.

2. The transferring apparatus according to claim 1 wherein said belt supporting members comprise:
    at least two axes fixedly mounted on said carrier in spaced parallel relation adjacent to each other and each of said outer sides of said carrier; and
    an outer roller mounted for rotation about each of said fixed axes.

3. The transferring apparatus according to claim 1, wherein said belt supporting members are curved portions (75) having a curvature small enough to allow said conveyor belt to slide therearound.

* * * * *

UNITED STATES PATENT OFFICE
CERTIFICATE OF CORRECTION

Patent No. 4,930,613                    Dated   June 5, 1990

Inventor(s)   Norio Okura; Ryoichi Okura; Tugio Yonetani

It is certified that error appears in the above-identified patent and that said Letters Patent is hereby corrected as shown below:

On the title page

In line (73), the assignee should read -- Okura Yusoki Kabushiki Kaisha --.

Signed and Sealed this

Fifth Day of November, 1991

*Attest:*

HARRY F. MANBECK, JR.

*Attesting Officer*      *Commissioner of Patents and Trademarks*